Jan. 12, 1960 — W. H. HULSWIT, JR., ET AL — 2,920,481
APPARATUS FOR DETERMINING THE TENDENCY
OF PNEUMATIC TIRES TO PRODUCE THUMP
Filed Nov. 2, 1953 — 4 Sheets-Sheet 1

INVENTORS
WILLIAM H. HULSWIT, Jr.
DANIEL R. ELLIOTT
EUGENE H. CULP
BY James J. Long
AGENT Jan. 12, 1960   W. H. HULSWIT, JR., ET AL   2,920,481
APPARATUS FOR DETERMINING THE TENDENCY
OF PNEUMATIC TIRES TO PRODUCE THUMP
Filed Nov. 2, 1953   4 Sheets-Sheet 4

INVENTORS
WILLIAM H. HULSWIT, Jr.
DANIEL R. ELLIOTT
EUGENE H. CULP
BY
James J. Long
AGENT United States Patent Office 2,920,481
Patented Jan. 12, 1960

2,920,481
APPARATUS FOR DETERMINING THE TENDENCY OF PNEUMATIC TIRES TO PRODUCE THUMP

William H. Hulswit, Jr., Grosse Pointe Farms, Daniel R. Elliott, Grosse Pointe Woods, and Eugene H. Culp, Detroit, Mich., assignors to United States Rubber Company, New York, N.Y., a corporation of New Jersey Application November 2, 1953, Serial No. 389,764

3 Claims. (Cl. 73—146)

This invention relates to an apparatus for determining the tendency of pneumatic tires to produce thump, and, more particularly, it relates to an electrical means for determining quantitatively the propensity of a given pneumatic tire to give rise to objectionable thump at various operating speeds.

Several factors in the design and use of modern automobiles and pneumatic tires have occasioned in recent years an increasing awareness among motorists of an objectionable prenomenon known as thump. Thump manifests itself as an objectionable vibration and/or noise experienced by occupants of a moving automobile, and it apparently arises from certain non-uniformities in the tire, the exact nature and origin of which are not fully understood at the present time. It has been desired to provide a simple and rapid test that would determine in advance whether a given tire would produce thump in use, in order that satisfactory tires might be separated from unsuitable ones before the tires were marketed. Such a test was also desired in conjunction with research and development work on the effect of tire design and manufacturing methods on thump.

The problem of measuring or evaluating thump has heretofore been complicated by the fact that the usual way of observing thump, that is, by actually driving a test car equipped with the tires in question, was highly subjective, since different operators were inclined to have different reactions, or the same operator might have a different reaction under slightly different conditions. It was therefore most difficult to obtain reliable quantitative information about thump, and research and development efforts to alleviate thump were consequently very much hampered. The problem was further complicated by the fact that the tendency of tires to produce thump was typically of more or less random occurrence, that is, some of the tires from a given production line might be found to be essentially free of thump, while other tires from the same production might be found to have pronounced thump.

Accordingly, the principal object of the present invention is to provide a simple and accurate test apparatus for indicating in an objective manner the tendency of a tire to produce thump.

The manner in which the invention accomplishes the foregoing object, as well as additional objects and advantages, will be made manifest in the following detailed description, which is intended to be read with reference to the accompanying drawings, wherein.

Figure 1:
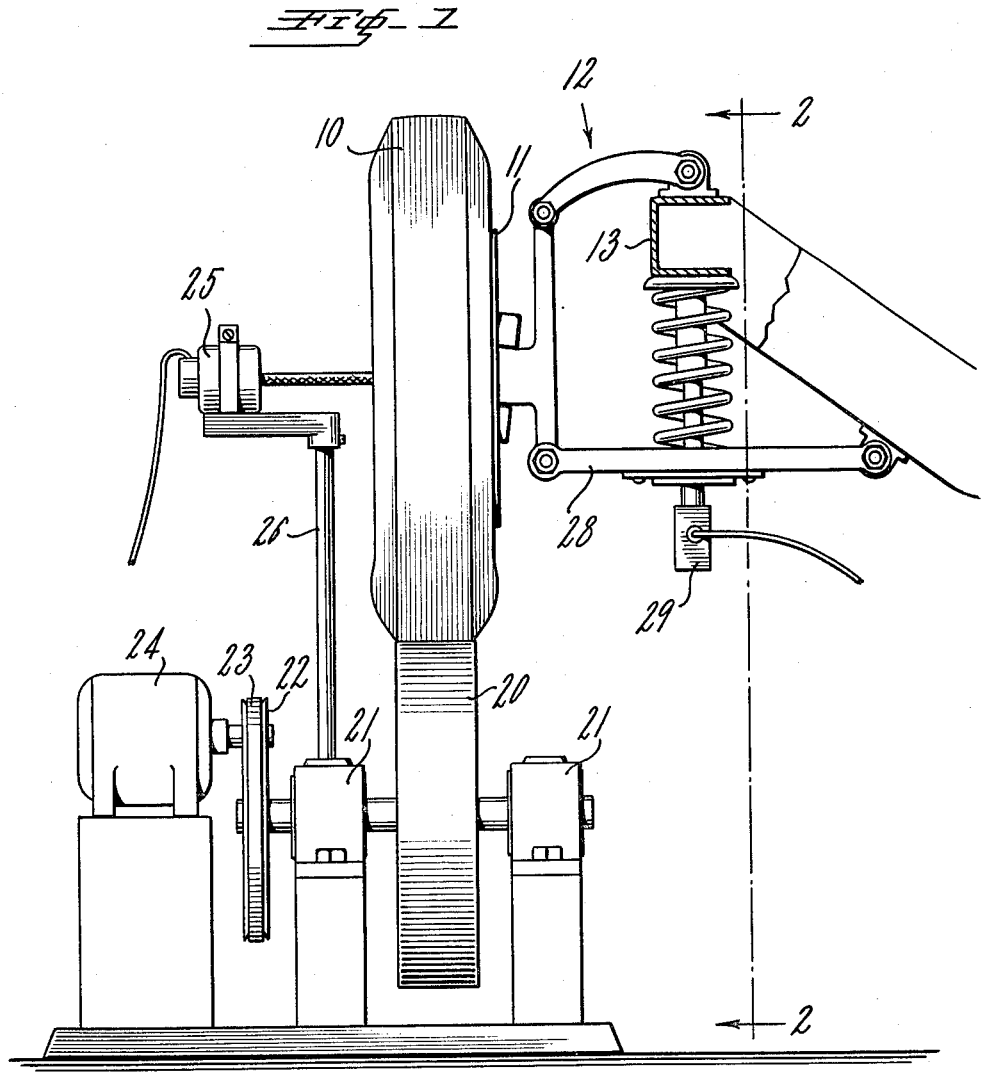
Fig. 1 is an end elevational view of an apparatus of the invention.

The invention contemplates supporting the tire to be tested in an inflated condition under a definite load simulating actual conditions of use of the tire. The test may be carried out on an actual vehicle that is to be run over a test course or on a dynamometer, or, if desired, the test may also be carried out in laboratory fashion with the tire rotatably supported on a suitable mechanism that preferably simulates to a greater or lesser extent the essential structural features of an actual automobile wheel suspension. In either case, the loaded, inflated tire is revolved at controlled speeds over a definite speed range corresponding to the usual operating speeds of the tire, against a supporting surface that may be represented by the road itself in the case of an actual road test, or may be represented by a suitable supporting wheel arrangement in the case of a dynamometer or laboratory test. In a laboratory test, we usually apply the desired load through the wheel on which the tire is mounted, and the tire rests upon the surface of the supporting wheel, which is driven in order to rotate the tire. However, we may also reverse this arrangement, and apply the load to the wheel representing the road surface, in which case such wheel is mounted above the test tire instead of below it. In this case, the wheel on which the tire is mounted may be driven, while the overhead load-applying wheel merely idles.

Revolution of the tire will produce a set of complex vibrations in the supporting mechanism of the tire and in the surrounding atmosphere, some of which will be manifested as audible noise, and others of which will be of a frequency too low to be discerned by the human ear. Thump is believed to have its origin in the fact that certain non-uniformities in the tire act as exciters of such vibration in the wheels and wheel-supporting mechanism of the automobile. Certain of the thus-excited portions of the automobile apparently act as resonating bodies and thereby greatly exaggerate the vibrations, particularly when the natural frequency of such resonators is a whole multiple of the speed of revolution of the tire. The vibrations pass through and about the frame of the vehicle and they are transmitted to the occupants of the car, particularly from large surfaces such as the floor boards or door panels, which act much like sounding boards. The thump is evident to the occupants of the car both as an unpleasant audible vibration and by feel.

The invention contemplates the disposition, in or about the vehicle, and in particular on or near the wheel suspension mechanism, of a device capable of converting these mechanical vibrations into corresponding proportionate electrical vibrations. Translation of the mechanical vibrations into electrical vibrations may be accomplished with the aid of any suitable known transducer or pick-up, such as a phonograph pick-up or a microphone, capable of responding to vibrations of the order of 20 to 300 cycles per second. A pick-up device having a natural frequency of the order of 30 cycles per second is particularly suitable.

The mechanical vibrations thus generated, and the corresponding electrical signals, will be of a complex nature and will include a number of frequencies which are multiples of what may be termed the fundamental frequency, corresponding to the speed of rotation of the tire. Successive oscillations in this complex vibration vary in amplitude, and the invention involves the examination of such variation, especially any such variation that occurs with a frequency corresponding to the fundamental frequency. In particular, the invention involves detection of any periodic variation superimposed or impressed on the oscillations and having the fundamental frequency, i.e., a frequency equal to the speed of rotation. The greater the amplitude of such variation, the greater and more intense the thump, and, converesly, when such variation is of small amplitude, the tire will evidence little or no thump in use. In the course of the test, we vary the speed of rotation of the tire over a range corresponding to the usual rates of speed at which the tire exhibits thump, commonly speeds of 20 to 40 miles per hour, or correspondingly wheel speeds of 4 to 8 cycles per second, and by observing the amplitude of the isloated fundamental variation at various speeds, we ascertain whether the tire will produce objectionable thump at any of these speeds.

The isolation and measurement of the variation or wave of fundamental frequency may be accomplished with the aid of an electrical circuit made up of a combination of conventional electrical devices. As a first step, we generally pass the initial electrical signal, obtained from the phonograph pick-up or equivalent transducer, through an amplifier and filter circuit of such characteristics that vibrations having a frequency within the range of from about 20 cycles to about 300 cycles per second are preserved and substantially intensified. The resulting electrical vibration constitutes a signal from which there has been essentially removed the oscillations of very low frequency, especially the oscillations having a frequency nearly the same as the wheel frequency (4 to 8 cycles), and those (about 12 cycles) associated with the so-called "wheel-hop," which is a consequence of the influence, on the wheel suspension, of the tire acting as a spring of definite natural frequency. From the resulting signal there have also been removed at this stage all extraneous or random noises, represented by the higher frequencies.

The electrical signal at this stage is characterized by the fact that successive oscillations vary in magnitude in a manner that may appear almost random when such signal at this stage is passed to an oscilloscope for visual examination. All of the essential features of the thump signal are contained in the signal at this point although in a form that would require an excessive amount of personal judgment on the part of an observer to estimate the amount of thump present. The same would be true if the signals at this point were fed into a loudspeaker. The oscilloscope reveals, in the form of a standing wave, the repeating wave pattern produced at each revolution of the tire. The pattern will be found to consist mainly of oscillations having a frequency within the range of 20–300 cycles, such oscillations varying in amplitude from place to place along a horizontal time axis. Each point on such horizontal time axis of course corresponds to a place on the circumference of the tire which is under load at that particular instant. We measure or evaluate thump by analyzing this signal to determine whether or not the place to place, or time to time, variations in the amplitude of the oscillations are of such a nature that there occurs once for each revolution of the tire a single grouping of oscillations of comparatively high magnitude. By separating and measuring the average amplitude of any such single grouping of unusually severe oscillations occurring once for each revolution of the tire, we obtain a truly quantitative indication of thump. To this end, the electrical circuit employed is such that the individual oscillations are, in effect, smoothed out or blended but their general or average pattern or envelope over the course of each revolution is preserved in the form of a wave having a frequency the same as the speed of the tire. This wave of fundamental frequency may be regarded as essentially an amplitude modulation impressed on the more rapid 20–300 cycle oscillations, which may be regarded essentially as a carrier wave of higher frequency.

We accomplish the foregoing by passing the signal, after the initial amplification and filtering stages, through a detector circuit, which may take the form of a full wave rectifier, followed by a filter of such characteristics that virtually all oscillations occurring more than once for each revolution of the tire are substantially removed or repressed. If the signal is now examined visually with the aid of an oscilloscope, there will be observed a standing wave of occurrence or frequency equal to the fundamental frequency, which is associated with the envelope or outline of the more complex aggregation of oscillations observed on the oscilloscope at the previous stage. The thus detected fundamental modulation wave will be of greater or lesser amplitude, depending on the degree of thump manifested by the tire. While such visual indication may be measured in any conventional manner to obtain a quantitative estimate of the thump, we prefer to employ a suitable electric meter which will provide a direct numerical indication of the amplitude of the signal, i.e., the intensity of the thump. For this purpose the signal is suitably fed through a rectifier and filter into a direct current microammeter. The characteristics of this portion of the circuit are preferably such that the amplitude of the wave tends to be enhanced when its frequency is identical to the fundamental frequency, and tends to be diminished if the frequency is greater than the fundamental frequency. However, in any event, the frequency of the signal at this stage will in all cases be very nearly the same as the fundamental frequency. After such final rectification and filtration, the value of the average amplitude may then be read from the meter, or, if desired, a suitable recorder may be associated with the meter circuit, to provide a permanent record.

Figure 2:
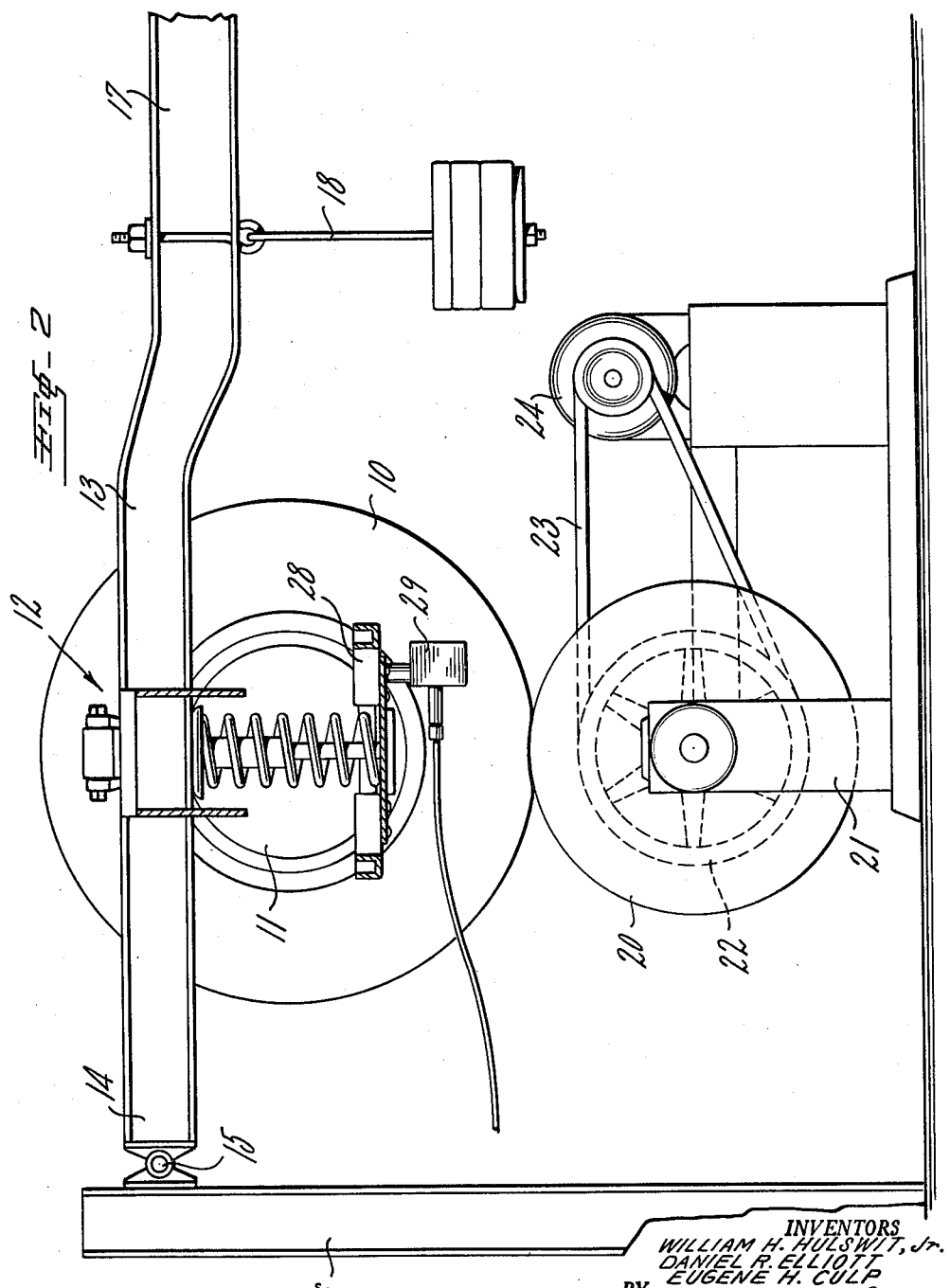
Fig. 2 is a side elevational view taken partly in section along the line 2—2 of Fig. 1.

Referring to the drawing, and in particular to Figs. 1 and 2, there is shown therein an arrangement particularly suitable for measuring in the laboratory or factory the tendency of tires to produce thump. A pneumatic tire 10 that is desired to test for thump is mounted in a vertical plane on a wheel 11 and inflated to normal operating pressure. The wheel 11 is mounted on a conventional automobile front wheel suspension assembly 12, that is in turn carried by a portion 13 of an automobile side frame. One end 14 of the frame member 13 is attached by a pivot 15 to a fixed supporting standard 16, while the other end 17 of the frame is unsupported. A weight holding device 18 depends from the unsupported end 17 of the frame, and the arrangement is such that the load imposed on the test tire through the frame may be varied by adding or removing weights of known value at the holder 18.

The test tire rests upon a supporting wheel assembly 20 rotatably mounted below the tire on spaced trunnions 21. A pulley 22 associated with the supporting wheel is connected by a driving belt 23 to a variable speed reversible electric driving motor 24 that is equipped with conventional control means (not shown) which may be manipulated by the operator conducting the test, to provide a desired range of speed in either direction. It will be understood that the tire is rotated during the test by the action of the supporting wheel upon which it rests. A tachometer device 25 is mounted on a supporting standard 26 in contact with the hub of the wheel on which the tire is mounted, to indicate the speed of rotation thereof at any instant during the test.

Figure 3:
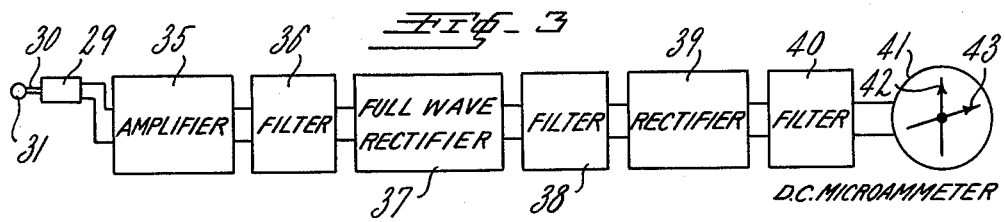
Fig. 3 is a block diagram of electrical devices associated with the apparatus.

Near the wheel 11, on a lower arm 28 of the wheel suspension, there is fastened an electrical pick-up device 29, comprised of a phonograph pick-up bearing the usual phonograph needle 30 (Fig. 3) having a small weight 31 fastened at its end in place of the customary point or jewel. The pick-up is arranged to respond to vibration in a vertical plane, and has a natural frequency of 30 cycles per second, and it is responsive to vibrations of the order of 20 to 300 cycles per second. The pick-up is electrically connected to a conventional amplifier 35 of such design that vibrations within the range of about 20 to 300 cycles are amplified substantially uniformly. There is associated with the amplifier 35 a conventional filter 36, which is suitably of such design that the maximum signal is passed by the filter at a frequency of about 60 cycles per second, while the signal passed by the filter below 30 cycles and above 120 cycles is only about one-half of the strength of the signal imposed at those frequencies, and below 15 cycles and above 250 cycles only about one-eighth of the imposed signal is passed.

The signal is then passed from the filter 36 into a full wave rectifier 37, which is suitably a rectifier having an efficiency of 80% or better, such as is attainable by employing two germanium diodes. The output of the rectifier 37 is passed to a second filter 38, the purpose of which is to remove from the signal all of the oscillations except the wave of fundamental frequency. The second filter 38 is preferably designed so that the maximum signal is passed at a frequency of about 3 cycles per second, while the signal passed below 1.5 cycles per second and above 6 cycles per second is only about one-half of the strength of the signal imposed at those frequencies, and below 0.75 cycle and above 12 cycles only about one-eighth of the signal is passed. It will be noted that the maximum response of the filter 38 occurs at a point somewhat lower than the average fundamental frequency of rotation of the tire over the typical range of test speeds (4 to 8 cycles per second), and such an arrangement is preferred in order to remove more completely from the signal any residiuum of the originally strong "wheel-hop" component, which is in the neighborhood of about 12 cycles per second. The electrical output of the second filter 38 is put into a form that can be measured with a direct current meter by passing it through a suitable rectifier 39 and filter 40 whence it passes into a direct current microammeter 41 in the conventional manner. The microammeter is provided with the usual needle or pointer 42 which indicates the average value of the amplitude of the final isolated fundamental signal. An auxiliary idler or tell-tale pointer 43 on the meter serves to indicate the value of the maximum signal registered in the course of any one test. The tell-tale needle 43 is reset manually at a low position at the start of each test.

In operation, the pneumatic tire 10 to be tested is mounted on the wheel 11 and inflated to a normal operating pressure. A standard load is imposed on the tire by placing weights of suitable value on the holder 18 depending from the pivotally supported automobile frame member 13. The driving motor 24 is then started to rotate the tire, through the supporting wheel 20, at a definite speed, as indicated by the tachometer 25. The complex mechanical vibrations thus generated in and about the tire and its supporting mechanism are picked up by the mechano-electrical transducer 29 wherein such vibrations are converted into equivalent electrical vibrations or pulses. This electrical signal is strengthened in the amplifier 35, and in the first filter 36 there are substantially removed from the signal those oscillations having a lower frequency, i.e., below 20 cycles per second, and those having a high frequency, i.e., above 300 cycles per second. The signal is then detected or demodulated by the full wave rectifier 37 and second filter 38 in such manner that there is isolated from the signal a wave of the fundamental frequency, which is associated with the envelope defined by the variations in amplitude of the oscillations in the 20-300 cycle range. The thus obtained wave of fundamental frequency is then passed through the second rectifier 39 and the third filter 40 for the purpose of measuring the average amplitude thereof on the microammeter 41. In the course of the test the operator gradually varies the speed of the driving motor 24 to provide tire speeds varying from 4 cycles to 8 cycles per second, corresponding to automobile speeds of about 20 to 40 miles per hour. Generally the thump indication on the meter 41 will attain a maximum at some particular speed, and the auxiliary tell-tale pointer 43 on the meter remains at such maximum value, and therefore such maximum can be observed at the conclusion of the test.

Figure 4:
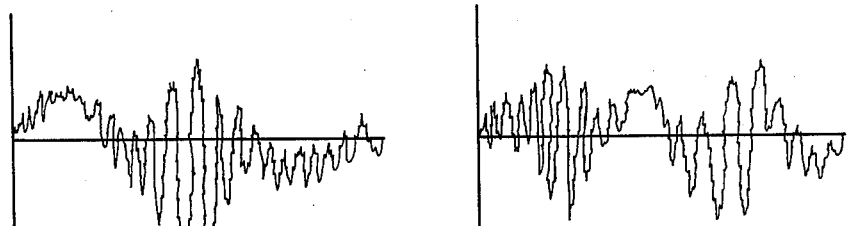
Figs. 4 to 15 are graphical representations of electrical signals obtained at various stages of the process.
Figure 10:
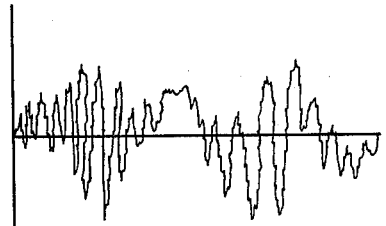

The general nature of typical electrical signals as they exist at various stages is exemplified in Figs. 4 to 15. Figs. 4 to 9 represent signals for a tire having severe thump, while Figs. 10 to 15 represent the corresponding electrical waves for a tire that displays little or no thump. In each case, the amplitude of the wave is plotted on a vertical axis, while the horizontal axis represents an elapsed time corresponding to a single revolution of the wheel. Figs. 4 and 10 represent the initial electrical signal after passing from the amplifier 35, in the cases, respectively, of a tire having severe thump and a tire having low thump. In both cases, the signal passed by amplifier 35 contains many unwanted components that tend to obscure the features in the signal that are characteristic of thump.

Figure 5:
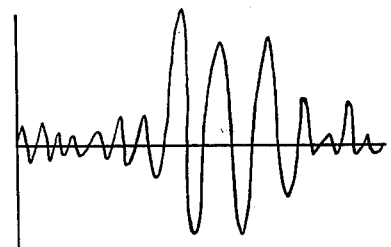
Figure 11:
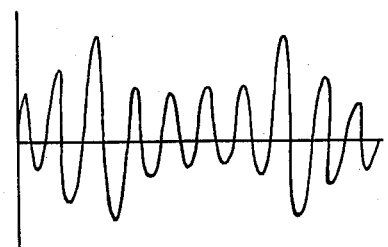

In Figs. 5 and 11 the signals are shown as they might appear after passing through the first filter 36. The poor tire, as indicated in Fig. 5, is characterized by the fact that the 20-300 cycle oscillations include a grouping of oscillations of comparatively large amplitude, occurring once per revolution. In the good tire, Fig. 11, the 20-300 cycle oscillations also vary in amplitude, and certain of these oscillations are comparatively severe, but there is no single band along the horizontal axis where the oscillations can be said to be markedly more intense than at any other band. In other words, the fundamental difference between the good tire and the bad tire is that in the bad tire, particularly severe oscillations occurred only once per revolution, that is, they occurred with a frequency equal to the fundamental frequency.

Figure 6:
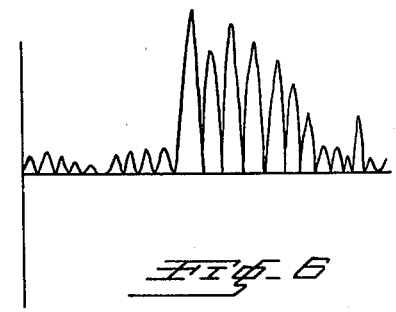
Figure 12:
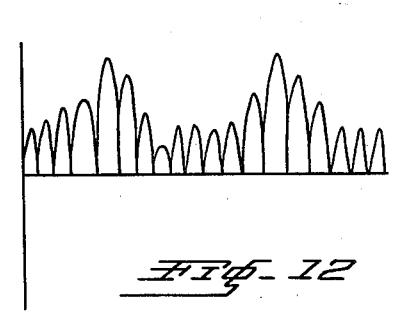
Figure 7:
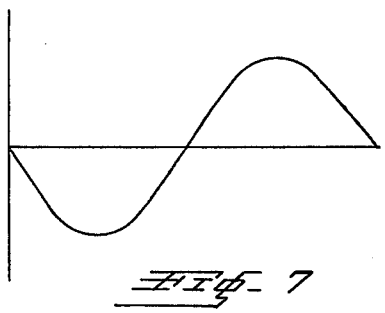
Figure 13:
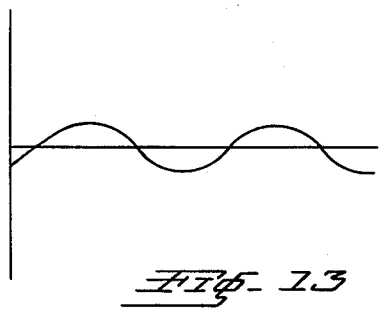

After rectification of the bad and good signals in the full wave rectifier 37, this fundamental difference between the bad tire and the good tire is preserved as shown in Figs. 6 and 12, respectively. Cancellation of all but the fundamental frequency in the second filter 38 yields, as shown in Fig. 7, for the poor tire a wave having the same frequency as the speed of rotation of the tire, and having a marked amplitude. In contrast, the signal for the good tire, after passing through the second filter is constituted in this particular instance, as shown in Fig. 13, of a wave of two times the fundamental frequency, and of relatively small amplitude.

Figure 8:
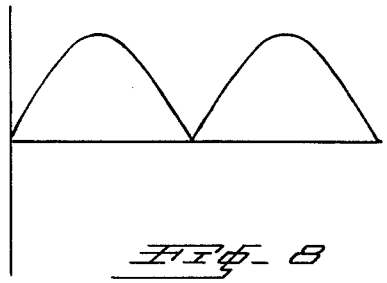
Figure 14:
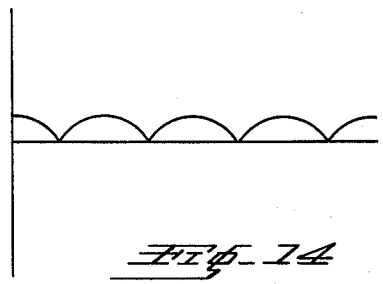
Figure 9:
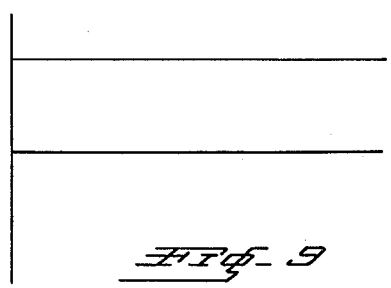
Figure 15:
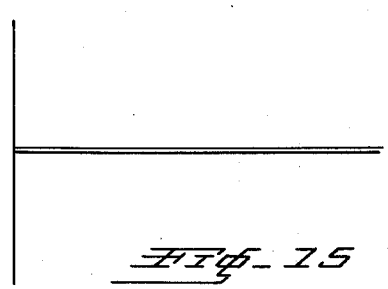

In Fig. 8, the fundamental wave of the poor tire, which may also be termed the detected signal taken from an amplitude modulated wave, has been passed to the second rectifier 39, to render it wholly positive prior to measuring its amplitude on the direct current meter. In Fig. 9, the strong thump signal has been passed through the third filter 40, providing a constant value which is registered on the meter. The corresponding signal for the good tire is shown in the rectified form in Fig. 14 and, due to the stronger action of the last filter on this higher frequency, registers little or no magnitude on the meter, as indicated by the finally filtered signal of Fig. 15.

Figure 16:
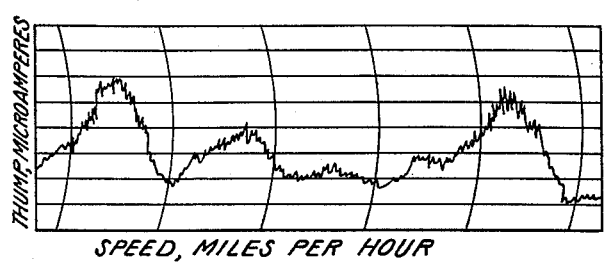
Fig. 16 is a graph showing a typical variation of measured thump vs. speed.

As indicated previously, the thump disturbance is variable with the speed of the tire and appears as a much stronger effect when the speed of the tire is such that the natural frequencies of one or more resonating bodies in the supporting mechanism or vehicle are whole multiples of the rate of rotation of the tire. Fig. 16 illustrates this point, showing a recording of the final signal made on a paper tape moving at a constant speed while the speed of the tire was increased at a constant rate. The large peaks and valleys in Fig. 16 indicate the variations in intensity of thump at various speeds.

Having thus described our invention, what we claim and desire to protect by Letters Patent is:

1. An apparatus for determining the tendency of a pneumatic tire to produce thump, comprising in combination a suspension mechanism, a wheel mounted on said suspension mechanism for rotatably supporting a tire to be tested in an inflated condition, means for imposing a desired load on the thus-supported tire, means for rotating the wheel whereby there are produced in and about the wheel and suspension mechanism definite vibrations bearing a periodic relation to the speed of revolution of the wheel, a mechano-electrical transducer mounted near said wheel for converting said vibrations into corresponding electrical vibrations, electrical means connected to said transducer for separating from said electrical vibrations a modulating component that occurs once for each revolution of the wheel, and electrical measuring means connected to said separating means for measuring the amplitude of said separated component.

2. An apparatus for determining quantitatively the relative tendency of a pneumatic tire to produce thump, comprising in combination a suspension mechanism, a wheel mounted on said suspension mechanism for rotatably supporting a tire to be tested in an inflated condition, means for imposing a desired load on the thus-supported tire, means for rotating the wheel over a definite variable speed range, whereby there are produced in the wheel and suspension mechanism and in the atmosphere in the neighborhood thereof complex mechanical vibrations having a modulating component of fundamental frequency equal to the speed of revolution of the wheel, a mechano-electrical transducer mounted on said suspension mechanism near said wheel for converting said mechanical vibrations into corresponding electrical oscillations, means for removing from said electrical oscillations those having a frequency of less than 20 cycles per second and more than 300 cycles per second, means for separating from the remaining electrical oscillations a fundamental modulating component thereof, and means for measuring the average amplitude of said fundamental modulating component.

3. Tire thump measuring apparatus comprising, in combination, microphonic sound pick-up means, amplifying means connected to said pick-up means, band-pass filter means connected to said amplifying means and having a pass band lying in a frequency range of from about 20 to 60 cycles per second, detector means connected to said band-pass filter means, low-pass filter means connected to said detector means and having an upper cut-off limit of around 10 cycles per second, and indicating means connected to said low pass filter means.

References Cited in the file of this patent
UNITED STATES PATENTS

| | | |
|---|---|---|
| 2,361,990 | Brown | Nov. 7, 1944 |
| 2,378,237 | Morris | June 12, 1945 |
| 2,618,971 | Herzegh | Nov. 25, 1952 |
| 2,695,520 | Karsai | Nov. 30, 1954 |
| 2,735,292 | Apps | Feb. 21, 1955 |